United States Patent [19]
Zimmer

[11] B 3,999,728
[45] Dec. 28, 1976

[54] ESCAPE VEHICLE WITH FLY-AWAY CAPABILITY

[75] Inventor: George F. Zimmer, Glendale, Calif.
[73] Assignee: Lockheed Aircraft Corporation, Burbank, Calif.
[22] Filed: Nov. 26, 1973
[21] Appl. No.: 419,173
[44] Published under the second Trial Voluntary Protest Program on March 9, 1976 as document No. B 419,173.

Related U.S. Application Data

[63] Continuation of Ser. No. 138,927, April 30, 1971.
[52] U.S. Cl. .................................. 244/140; 244/2
[51] Int. Cl.² ...................................... B64D 25/12
[58] Field of Search .............. 244/138 R, 139, 140, 244/2; D12/71

[56] References Cited

UNITED STATES PATENTS

| 3,006,576 | 10/1961 | Elijah | 244/2 |
| 3,289,974 | 12/1966 | Cohen et al. | 244/2 X |
| 3,298,633 | 1/1967 | Dastoli et al. | 244/2 |

FOREIGN PATENTS OR APPLICATIONS

| 831,978 | 4/1960 | United Kingdom | 244/2 |

OTHER PUBLICATIONS

"F-111 Escape System," *Flight International*, Oct. 3, 1963, p. 591.

Primary Examiner—Trygve M. Blix
Assistant Examiner—Barry L. Kelmachter
Attorney, Agent, or Firm—Billy G. Corber; Frank L. Zugelter; Lowell G. Turner

[57] ABSTRACT

An escape capsule integrally designed within a parent aircraft and having a fly-away capability throughout the entire speed range of the parent aircraft. The capsule utilizes segments of the leading edges of the aircraft wings to provide flight capability and stabilization to the capsule, an elevon system controlling the capsule about both its lateral and longitudinal axes, and rudder and vertical stabilizing elements for controlling the capsule about its vertical axis. A rocket is provided to supply the thrust necessary to accomplish positive separation of the capsule from the parent aircraft along a required trajectory. A thrust system, such as a turbojet or fan jet engine, is provided for sustaining the capsule in flight.

2 Claims, 5 Drawing Figures

GEORGE F. ZIMMER
INVENTOR.

BY George C. Sullivan
Agent

Frank L. Zugelter
Attorney

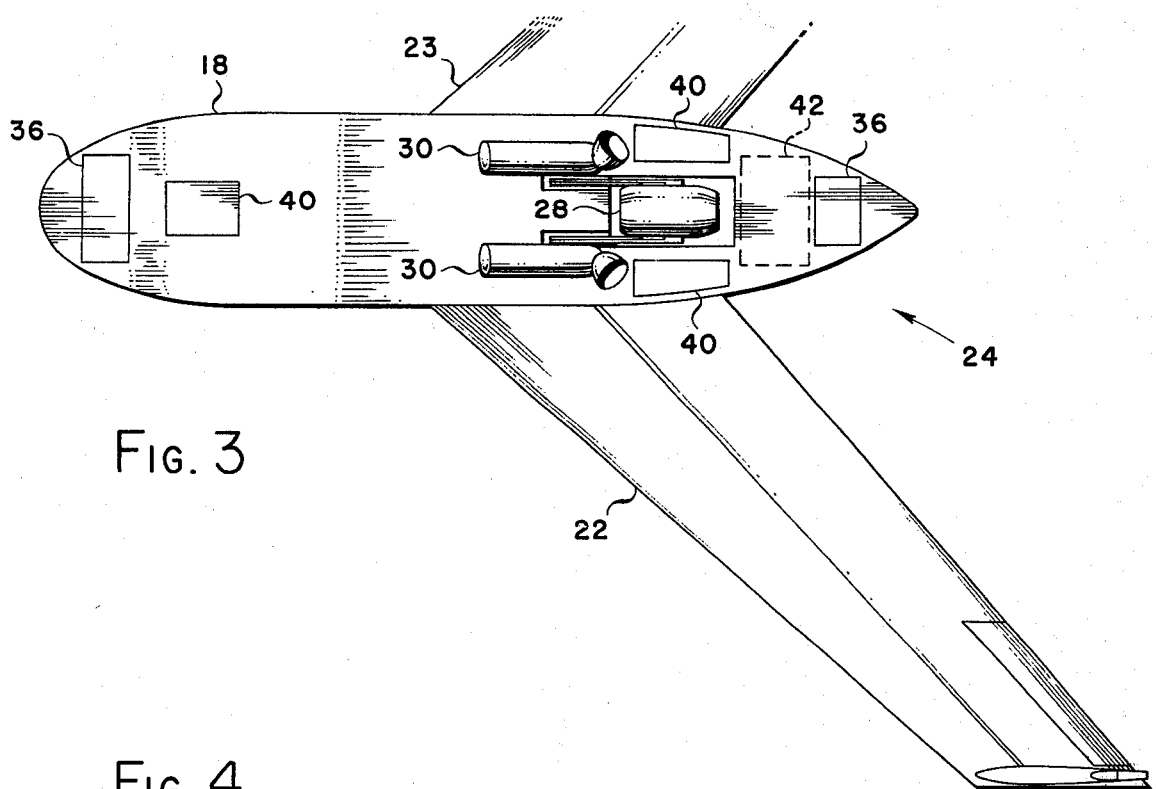
Fig. 3
Fig. 4
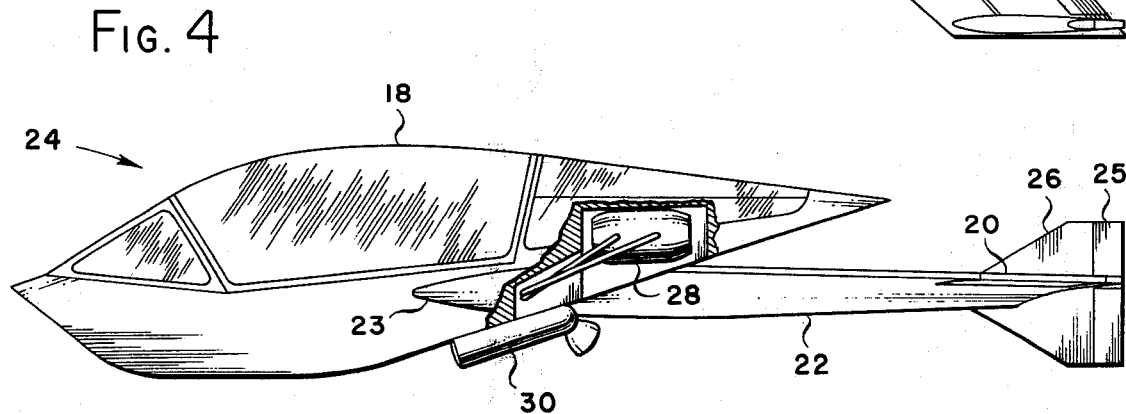
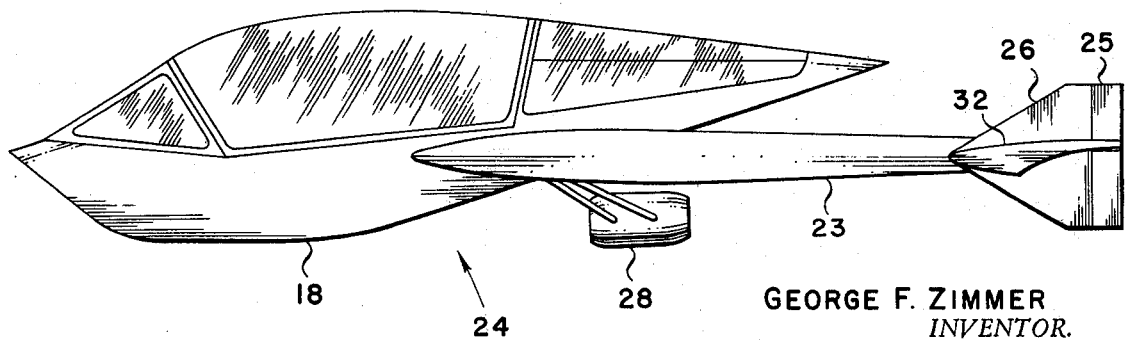
Fig. 5
GEORGE F. ZIMMER
INVENTOR.
BY George C Sullivan
Agent
Frank L. Zugelter
Attorney

ESCAPE VEHICLE WITH FLY-AWAY CAPABILITY

This is a continuation of application Ser. No. 138,927, filed Apr. 30, 1971.

BACKGROUND OF THE INVENTION

1. Field of the Invention.

The field of art to which the invention is most likely to pertain is located in a class of devices generally relating to escape and ejection systems for aircraft vehicles. Class 244, Aeronautics, U.S. Patent Office Classification, may be the applicable general area of art in which the claimed subject matter of the type involved here may be classified.

2. Description of the Prior Art.

Examples of prior art devices in the arts to which this invention most likely pertains are disclosed in U.S. Letters Pat. Nos. 3,006,576; 3,067,973; 3,227,399; 3,289,974; 3,298,633; and British Pat. Nos. 831,978 (Apr. 6, 1960); 899,043 (June 20, 1962); and 1,141,669 (Jan. 29, 1969).

Problems in the Prior Art.

No concept or embodiment in escape systems for flight crews which provides for escape at any altitude, on the ground or in space, and up to maximum velocity of a non-re-entry parent aircraft has ever been devised or perfected prior to this invention. By non-re-entry, I mean an aircraft not designed for either interplanet or earth orbit transportation, or one having aerodynamically-sustaining surfaces on the vehicle. Further, perfection of any development for a fly-away capsule; i.e., one having not only the aerodynamic control surfaces for controlling the capsule in its flight, but one also having the thrust means for sustaining it in its flight, has been limited in practice. For example, the British patent disclosure, No. 899,043 teaches use of merely a rocket for effecting a landing in gliding flight or under the power of the rocket itself. To date, stable ejection seat systems have been made, and systems in which as cockpit enclosure together with stablizing fins and drogue chute with a recovery parachute which ensures safe descent in the face of the force of gravity are known. Presently, attempts to perfect a "para-wing" jet-powered military ejection seat which glides down under a para-wing (a canvas foil unfolded after ejection) have not been fully developed. In each of the schemes employed to date, each can be utilized or deployed under very limited conditions existing at the time of ejection. Some of these schemes demand consideration for the human body to be able to withstand the physical stress of acceleration and deceleration, and wind blast forces at or during ejection. In other schemes, the capsule containing the crew commands a very limited degree of aerodynamic maneuverability, as exemplified by the referred-to British patent disclosure. One of the most aggravating problems inherent in conventional escape systems is vehicle or ejection seat stability.

Further, the past and presently employed escape systems have and are always added subsequently to the design of the aircraft, and not integrally incorporated as part of its design. These additions include weight and wetted area penalties, in most cases, and in the main, are afterthoughts.

SUMMARY OF THE INVENTION

The present invention reduces or diminishes the weight and wetted area penalties normally imposed or associated with aircraft designs which heretofore required a crew escape system, and provides a stable escape system, and provides fly-away capability. By fly-away capability, I mean capability meeting the aerodynamic principles necessary for continuous powered flight and non-powered glide.

This invention relates to an emergency escape system for an airborne non-re-entry type vehicle, and in particular is directed to a self-sustaining escape capsule integrally designed into its parent aircraft.

An object of this invention is to provide an emergency escape capsule for a flight crew and which can be initiated at ground level or at any altitude and from zero speed to maximum velocity of its parent aircraft.

Another object of the invention is to provide a stable, fly-away capsule at the time of initiating escape, and throughout its entire flight.

A further object of the invention is to provide an escape system in which violent tumbling and erratic movements are eliminated.

Another object of the invention is to reduce or diminish weight and wetted area penalties to a minimum, as applied to the design of the parent aircraft.

Another object of this invention is to provide an escape capsule or vehicle having adequate control and maneuverability to recover such capsule from inadvertent attitudes at the time of ejection, and to control it for conventional powered and non-powered flight.

These objects and other advantages will become more fully apparent upon a full reading of the following description, appended claims and the accompanying drawing.

BRIEF DESCRIPTION OF THE DRAWING

FIG. 3 is an underplan view of the vehicle in separated mode.

FIG. 4 is an elevational view of the escape capsule of FIG. 3.

FIG. 5 is an elevational view of the vehicle shown in flight mode, with thrust engine deployed and rocket means jettisoned.

DESCRIPTION OF THE PREFERRED EMBODIMENT

Figures 1, 2:
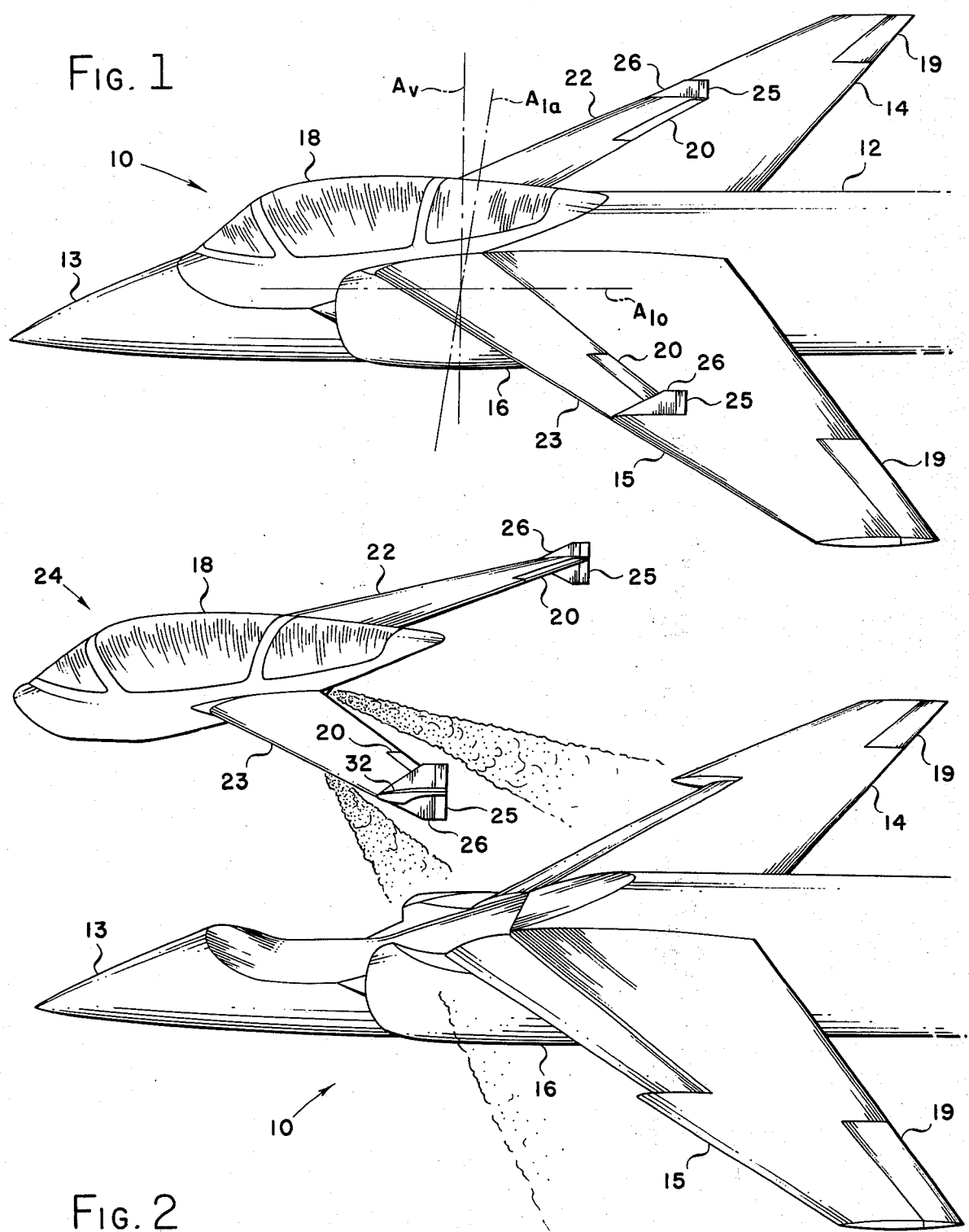
FIG. 1 is a perspective view of an airborne vehicle embodying the invention.
FIG. 2 is another perspective view of such aircraft with its escape capsule detached therefrom and in separating mode.

Referring now to the drawing in which reference characters therein refer to corresponding numerals in the following description, reference character 10 refers to an aircraft or other airborne non-re-entry type vehicle to which the invention is adapted. Aircraft 10 comprises a fuselage 12, a nose 13 mounted on fuselage 12, a wing or pair of wings 14, 15 mounted to fuselage 12, propelling means 16 such as a jet engine or engines, a crew compartment 18, and an elevator-rudder system mounted independently of the wings 14, 15 and at the rear of the fuselage 12, but which is not shown as it is not necessary to describe same for purposes of this invention. The wings 14, 15 are mounted forwardly of and separately from the vehicle's elevator-rudder system. Included in and along the trailing edge of each wing 14, 15 is a conventional-type control surface 19.

An elevon member 20 is mounted upon or within a segment 22, 23 (FIG. 2) of a leading edge of each wing 14, 15, respectively, for the purpose of providing the escape capsule 24 (FIG. 2) with control about both the lateral axis $A_{1a}$ and longitudinal axis $A_{1o}$. Rudder and vertical stabilizing elements 25, 26, respectively, are provided on each leading edge segment 22, 23 for controlling the escape capsule 24 and for providing directional control about the vertical axis $A_v$ for capsule 24 in its own mode of flight.

An engine 28 (FIGS. 3, 4, 5) is suitably mounted within the framework of the escape capsule 24 for the purpose of providing thrust in its own mode of flight after separation from aircraft 10. Additional means 30, such as a suitable rocket motor or motors, are also provided on such framework for effecting a positive separation of the capsule 24 from its parent aircraft 10 and to control the rate of deceleration during or for high speed escape modes, and to provide a suitable trajectory during and for zero-zero and low speed, low altitude escape modes.

Thus, upon complete separation of capsule 24 from aircraft 10 the capsule itself becomes in effect an airborne vehicle having control and power necessary to sustain prolonged and continuous flight.

Leading edge segments 22, 23 provide escape capsule 24 with a wing, designed to provide its own flight capability. These edge segments 22, 23 are integrated with and in the design of their respective wings 14, 15 and of course, are connected to the capsule 24. Upon the capsule 24 separating from its parent aircraft 10, the disposition of the vertical stabilizing and rudder elements 26, 25 are seen to be mounted adjacent to the exterior tips 32 of such leading edge segments 22, 23. These elements are either deployed at the time of separation or fixed, depending on the performance requirements of the parent aircraft 10.

The position of a set of fixed elements 26 results from the design for and fabrication of a given aircraft 10, for the purpose of achieving an efficient flight mode for either aircraft or separated capsule. Wings 14, 15 include sufficient swept-back characteristics about fuselage 12, so that directional stability and control by means of the elevon system comprising elements 20, 25 and 26 is achieved for the capsule 24 in its own mode of flight.

Engine 28, used to propel capsule 24, is normally stowed within the shell or framework of capsule 24, as illustrated in FIG. 4, and may be suitably positioned and held therein, during its non-deployed condition. Suitable means (not shown), well-known in the art, are provided to lower engine 28 into its flight position at an appropriate time in the escape profile, and remains in such deployed position throughout the flight mode of the capsule 24 (FIG. 5). Fuel for engine 28 is carried in the leading edge segments 22, 23.

Means 30, such as one or more rocket motors, provides a method by which the capsule 24 is ejected from the airframe of its parent aircraft 10, and is tailored to the escape requirements. Two or more solid propellant rocket motors may be used and programmed for this purpose. Suitable indexing lugs and vernier adjustments (not shown), well-known expedients in the aerospace industry, may be used and made to correctly align the direction of the thrust obtained from such means 30, in order to achieve a desired or predetermined trajectory. Means 30 are located below the aft cockpit floor. After the escape capsule 24 has achieved a cruising flight mode, provisions may be included to jettison means 30 and thereby provide a lighter weight and consequent longer flight duration for the capsule.

In regard to initially separating the capsule from its parent aircraft 10, suitably placed linear shaped explosive charges and/or explosive-nuts, bolts, and cutters are incorporated immediately below the floor of the capsule and at strategic points of the framework of the entire aircraft 10 including its wings. The detail of a particular explosive charge system need not be incorporated within this disclosure, as methods of explosively separating parts of aircraft are well-known and has had an operational history with an exceptional reliability record. Consequently, it should be understood that any suitable explosive charge system may be utilized, and may be readily fashioned in accordance with and for a particular design specification for an aircraft 10.

The structure of the capsule 24 is conventional and the integrity of its design satisfies the design criteria of its parent aircraft 10. Such design enhances the diminishment of weight and wetted area penalties.

Capsule 24 becomes operative under conditions which prevent continued performance or flight of its parent aircraft 10. For example, battle or other damage to aircraft 10 may demand immediate action on the part of the flight crew to escape therefrom as the only way in which to survive. Under such conditions, the pilot or crew member in charge initiates escape by, say, for example, pulling a D-ring located in a convenient location in the cockpit. This technique has been well-known in regard to conventional escape schemes, and may be utilizable here, also. By so doing, the explosive charges are actuated to cut the structural joints between capsule and the airframe of the aircraft, and thus provide for the mechanical separation of the two. Force is applied to the structurally separated fly-away capsule 24 by means 30 to completely divorce or separate it from the disabled parent aircraft 10. After burn-out of means 30, engine 28 provides the thrust required for sustained flight and climb. The normal cockpit controls of the aircraft can, upon separation of the fly-away capsule from its parent aircraft, become the control system for the fly-away capsule, or a separate set of controls or system may prove more feasible. This can be accomplished by use of fly-by wire or mechanical systems, depending upon consideration of control transfer requirements. Fuel for engine 28 may be carried by the leading edge segments 22, 23 or within the capsule framework. Fuel system free of selectors or management features may be incorporated when engine 28 starts. The system needs no control other than the throttle control for the engine.

Conventional ignition means for both engine 28 and rocket means 30 may be incorporated within capsule 24 and suitably mounted therein for respective purposes of each element 28, 30.

In the event a water landing is anticipated, deployable flotation bags 36 are mounted in advantageous positions of capsule 24, such as illustrated in FIG. 3. Bags 36 insure capsule buoyancy. By providing bags 36 forward and aft, flotation and stabilization of the capsule 24 are attained.

Vehicle 24 can be landed in the manner of a conventional airplane. Landing skids (not shown) required for the conventional landing mode may be suitably mounted to capsule 24. Inflatable bags 40 incorporating blow-out plugs (FIG. 3) may be included for easing the impact following a vertical descent in the event capsule 24 was in some way damaged beyond its fly-away performance capabilities.

In the latter instance, a recovery parachute 42 is deployed for the purpose of safely landing the capsule.

It should now be apparent that various advantages arise from this invention and not heretofore observed in any escape system for aircraft. Crew escape and recovery from an aircraft moving at any speed between zero and a given Mach number is virtually assured as the crews' human body limitations are protected by being within the confines of the crew compartment 18 portion of the escape capsule 24. Capsule stabilization is accomplished. Considerable weight savings is achieved over aircraft systems heretofore including escape schemes employing the addition of deployable vanes, fins, drogue chutes, or other surfaces. And one of the most important, the fly-away capability of the capsule.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. In a non-re-entry type vehicle including a fuselage on which a set of wings and an elevator-rudder system are mounted independently of each other, the wings being mounted forwardly of and separately from the vehicle's elevator-rudder system and having a swept-back characteristic, the vehicle having an escape capsule with fly-away capability, an improvement in said escape capsule comprising in combination, a crew compartment in said capsule and having structural integrity upon its separation from said vehicle and being capable of all flight modes throughout the entire speed range of said vehicle either as part thereof or of the separated capsule, segments of the wing leading edges of said vehicle being nested in and separable from the balance thereof and being integral with and defining swept-back wings of said capsule upon such separation from said vehicle and providing the flight capability and the stabilization of said capsule necessary for powered and non-powered flight, an elevon system mounted on each of the capsule wings providing control about both the lateral and longitudinal axes of said capsule, rudder and vertical stabilizing elements mounted on the tips of the capsule wings for controlling and providing directional control about the vertical axis for said capsule, rocket means on said capsule for completing its separation from the patent vehicle and for controlling its trajectory and decelerating speed, and power means to said capsule for effecting flight capability thereof after such separation.

2. The combination of claim 1 wherein said power means is an engine normally stowed within said capsule and is extendable therefrom after separation for powering said capsule.

* * * * *